Sept. 25, 1923.

H. F. WHITTED ET AL 1,469,201

AUTOMATIC INFLATING DEVICE

Filed Nov. 9, 1922

WITNESSES

H. F. Whitted, INVENTORS
F. G. Schulze,

BY
ATTORNEYS

Patented Sept. 25, 1923.

1,469,201

UNITED STATES PATENT OFFICE.

HOWARD FERRIS WHITTED AND FRANK GERHARDT SCHULZE, OF SANTA PAULA, CALIFORNIA.

AUTOMATIC INFLATING DEVICE.

Application filed November 9, 1922. Serial No. 599,872.

*To all whom it may concern:*

Be it known that we, HOWARD F. WHITTED and FRANK G. SCHULZE, citizens of the United States, and residents of Santa Paula, in the county of Ventura and State of California, have invented certain new and useful Improvements in Automatic Inflating Devices, of which the following is a specification.

This invention relates to inflating devices and is more particularly directed to a device for automatically controlling the supply of fluid under pressure to tires.

An object of the invention is the provision of a device which will permit the flow of air under pressure to a tire and which will automatically cut-off the flow of air when the pressure in the tire has advanced to the maximum desired in the tire.

A further object of the invention is the provision of a device for controlling fluid under pressure to an inflatable article and which device is capable of being set to automatically cut off the flow of fluid pressure when the pressure in the article has reached the limit of pressure contemplated for the article.

Other objects and objects relating to details of construction will be hereinafter described.

The invention is illustrated by way of example in the accompanying drawings, in which, Figure 1 is a vertical section of the automatic fluid control.

Figure 1:
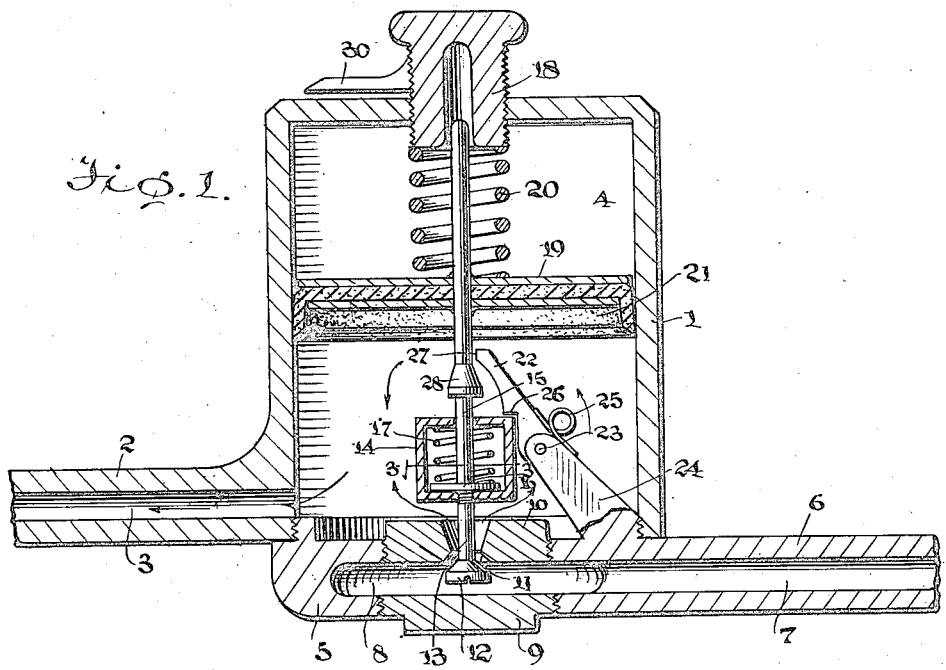

Referring to the drawings, 1 indicates a casing which is of cylindrical shape and is provided with an outlet tube 2 having a passage 3 connected with the chamber 4 formed within the casing 1. A cap or closure 5 has a reduced threaded upper portion engageable with the internal threads on the lower open end of the casing 1. The cap 5 provides an air-tight closure for the lower end of the chamber 4. The cap is provided with a tube 6 having an inlet passage 7 leading into a small cylindrical chamber 8 formed within the cap 5.

A threaded plug 9 is screwed into a threaded opening in the cap 5 for closing the chamber 8 from the atmosphere. The plug 9 likewise provides means for inspecting certain parts located within the chamber 4 after the removal of the cap 5. Within the threaded opening at the top of the chamber 8 of the cap 5 is a second plug 10 which is provided with a centrally disposed valve seat 11 on which is adapted to seat a valve 12 which, when closed, cuts off the air under pressure from the passage 7 to the chamber 4.

A stem 13 of the valve 12 is screwed into the bottom of a cage 14.

A stem 15 disposed centrally of the chamber 4 is inserted through a passage in the upper end of the cage 14 and provided with a disc 16 rigidly mounted at its lower end with the disc slidable within the cage 14. A spring 17 surrounding the stem 15 and pressing against the under face of the top of the cage 14 and upon the top of the disc 16, tends to maintain the disc 16 at the bottom of the cage 14.

The upper end of the stem 15 is slidable within a central passage within a plug 18 which forms a guide for the upper end of the stem. Loosely mounted midway of the ends of the stem 15 is a metal disc 19 which is slidable within the chamber 4 and is maintained in its lowermost position by means of a compression spring 20, the upper end of which engages the lower end of the plug 18, while the lower end of the spring engages the upper face of the disc 19.

Rigidly secured to the stem 15 and having its upper face in engagement with the lower face of the disc 19 is a cup 21 movable with the stem 15 and forming an air-tight piston within the chamber 4.

A keeper 22 is pivotally mounted at 23 on a bracket arm 24 which is integrally formed with the cap 5 and removable therewith. A spring 25 connected with the bracket 24 engages with the keeper 22 for maintaining the notch 26 in engagement with the upper end of the cage 14. A toe 27 of the keeper is adapted to be engaged by the conical enlargement 28 formed on the stem 15 when said stem is moved upwardly whereby the toe 27 is moved outwardly and likewise the keeper 22 for releasing the notch or shoulder 26 from its engagement with the cage 14.

Figure 2:
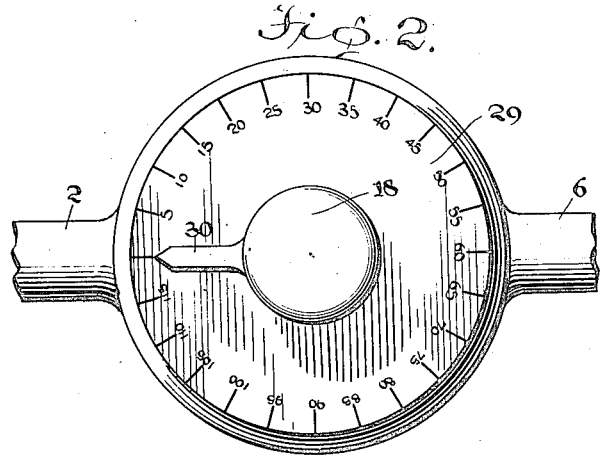
Figure 2 is a plan view of the same.
Figure 3:
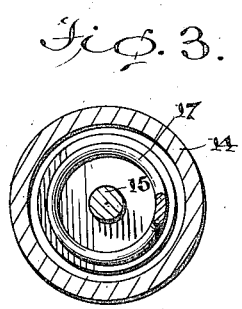
Figure 3 is a transverse horizontal section taken on the line 3—3 of Figure 1.

A dial 29, shown in Figure 2, is formed on the top of the casing 1 and provided with a scale to designate the number of pounds of air pressure which may be had within the chamber 4 by the setting of the hand or pointer 30 to one of the numbers indicated on the dial.

The operation of the device is as follows:

Air is admitted to the passage 7 of the tube 6 from the source of fluid under pressure whence said air will escape past valve 12 through the port in the plug 10 and into chamber 4 then out through passage 3 of tube 2. As the pressure within the tube, and likewise the chamber 4, is advanced, the air will act upon the piston 21 and force said piston and valve stem 15 upwardly. Disc 16, which is connected with stem 15, will likewise be moved upwardly against the tension of the spring 17, while piston 21 and disc 19 are moved upwardly against the tension of spring 20. The keeper 22, through the shoulder 26, maintains the cage 14 in the position shown in Figure 1, while disc 16, stem 15 and piston 21 are moving upwardly.

The continued upward movement of the stem 15 causes the enlargement 28 to force the toe 27 and keeper 22 outwardly until the shoulder 26 of said keeper has been released from its engagement with the cage 14 whereby the spring 17 will immediately act to force the cage 14 upwardly and close the valve 12 tight upon its seat 11 and thereby prevent further air from the passage 7 being admitted to the chamber 4 and likewise to the tire.

It is to be understood that before the tire has been inflated or before the tire has been connected with the automatic control, the pointer 30 is moved to the number on the dial which indicates the pressure desired. When the pointer is moved to increase the pressure from zero to any desired pressure, the spring 20 is compressed, thereby requiring a greater pressure to move the piston 21 upwardly in the chamber 4. The reverse movement of the pointer 30 will require less pressure for automatically causing the valve 12 to be closed, through piston 21, since less pressure has been placed upon the upper surface of piston 21 by the release of the compression on spring 20.

What we claim as new is:

1. In a fluid pressure control, a cylindrical casing, a fluid-tight piston movable within the casing, a stem secured centrally to the piston and movable longitudinally of the casing, a cage slidable on the stem, a disc on the lower end of the stem and slidable within the cage, a spring within the cage adapted to resist opposite movements of the stem relative to the cage, a closure for the bottom of the casing provided with a chamber, a port connecting said chamber with the casing, a valve operatively connected with the cage adapted to close the port between the chamber in the closure and the casing, means connecting the chamber in the cap closure with a source of fluid under pressure, a spring pressed keeper engageable with the cage for maintaining the cage locked in its lowermost position and the valve in open position, a conical enlargement on the piston stem engageable with the keeper for releasing the keeper from its engagement with the cage when the piston is moved upwardly at a predetermined pressure in the casing, and a spring resisting the upward movement of the piston.

2. In a fluid pressure control, a cylindrical casing, a fluid-tight piston movable within the casing, a stem secured centrally to the piston and movable longitudinally of the casing, a cage slidable on the stem, a disc on the lower end of the stem and slidable within the cage, a spring within the cage adapted to resist opposite movements of the stem relative to the cage, a closure for the bottom of the casing provided with a chamber, a port connecting said chamber with the casing, a valve operatively connected with the cage adapted to close the port between the chamber in the cap closure and the casing, means connecting the chamber in said cap closure with a source of fluid under pressure, a spring pressed keeper engageable with the cage for maintaining the cage locked in its lowermost position and the valve in open position, a conical enlargement on the piston stem engageable with the cage when the piston has been moved upwardly by a predetermined pressure in the casing, a spring resisting the upward movement of the piston, a plug having a threaded engagement with an opening in the top of the casing and adapted when screwed into the casing for compressing the last mentioned spring to increase the resistance to the upward movement of the piston, a dial on the top of the casing provided with a scale indicating degrees of pounds pressure, and a pointer on the last mentioned plug adapted to pass over the scale when the plug is screwed into the casing for indicating the pressure of the fluid desired within the casing and which pressure is exerted against the piston to cause the keeper to be released for closing the valve.

3. In a fluid pressure control, a casing closed at one end, a cap having a threaded engagement with the open end of the casing and having threaded openings in its top and bottom, a chamber formed within the cap, a removable plug having a threaded engagement with the opening at the bottom of the cap, a plug having a threaded engagement with the opening at the top of the cap and provided with a port connecting the casing with the chamber in the cap, said chamber being in open communication with a source of fluid under pressure, a valve in communication with the port for controlling admission of the fluid from the chamber in the cap to the casing, and means within the casing automatically operated by the fluid under pressure for actuating the valve to closing position when the pressure within the casing reaches a predetermined degree.

4. In a fluid pressure control, a chamber provided with an inlet and outlet for fluid under pressure, a valve for controlling the flow of fluid pressure to the chamber, means acted upon by the fluid pressure tending to close the valve, means for restraining the closing means, and means operated by the closing means for causing the restraining means to become inactive and permit actuation of the closing means for moving the valve to closed position and cutting off the fluid under pressure to the chamber.

5. In a fluid pressure control, a chamber provided with an outlet and inlet for fluid under pressure, a valve for controlling the flow of fluid pressure to the chamber, means acted upon by the fluid pressure tending to close the valve, means for restraining the closing means and movable independently of the closing means, and means operated by the closing means for causing the restraining means to become inactive, and means adapted to cooperate with the closing means upon the restraining means becoming inactive to cause closing of the valve.

6. In a fluid pressure control, a cylindrical casing, a fluid-tight piston movable within the casing, a stem secured centrally to the piston and movable longitudinally of the casing, a cage slidable on the stem, a disc on the lower end of the stem and slidable within the cage, a spring within the cage adapted to resist opposite movements of the stem relative to the cage, a closure for the bottom of the casing provided with a chamber, a port connecting said chamber with the casing, a valve operatively connected with the cage adapted to close the port between the chamber in the closure and the casing, means connecting the chamber and the cap closure with a source of fluid under pressure, a spring pressed keeper engageable with the cage for maintaining the cage locked in its lowermost position and the valve in open position, a conical enlargement on the piston stem engageable with the keeper for releasing the keeper from its engagement with the cage when the piston is moved upwardly by a predetermined pressure in the casing, and means resisting the closing means, and means for varying the resistance of the last mentioned means whereby various pressures within the chamber may be maintained before the valve is closed.

7. In a fluid pressure control, a chamber provided with an inlet and outlet for fluid under pressure, a valve for controlling the flow of fluid pressure to the chamber, means acted upon by the fluid pressure tending to close the valve, resilient means connecting the valve to the fluid pressure actuated means in a manner to provide independent movements of the valve and the first mentioned means, means for restraining the fluid pressure actuated means to delay closing the valve, and means for causing the restraining means to become inactive whereby the fluid pressure actuated means may be operated to close the valve.

8. In a fluid pressure control, a chamber provided with inlets and outlets for fluid under pressure, a valve for controlling the flow of fluid pressure to the chamber, and means acted upon by fluid pressure tending to close the valve, movable means for restraining the closing means, and means operated by the closing means for moving the restraining means to an inactive position whereby the closing means may be actuated to operate the valve and cut off fluid pressure to the chamber.

HOWARD FERRIS WHITTED.
FRANK GERHARDT SCHULZE.
Witness:
W. M. REESE.